US012234891B2

(12) United States Patent
Shirota et al.

(10) Patent No.: US 12,234,891 B2
(45) Date of Patent: Feb. 25, 2025

(54) TOROIDAL CONTINUOUSLY VARIABLE TRANSMISSION

(71) Applicants: NSK LTD., Tokyo (JP); KAWASAKI JUKOGYO KABUSHIKI KAISHA, Kobe (JP)

(72) Inventors: Daiki Shirota, Fujisawa (JP); Kippei Matsuda, Kobe (JP); Hideyuki Imai, Kobe (JP)

(73) Assignees: NSK LTD., Tokyo (JP); KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/006,049

(22) PCT Filed: Jul. 15, 2021

(86) PCT No.: PCT/JP2021/026703
§ 371 (c)(1),
(2) Date: Jan. 19, 2023

(87) PCT Pub. No.: WO2022/019220
PCT Pub. Date: Jan. 27, 2022

(65) Prior Publication Data
US 2023/0349450 A1    Nov. 2, 2023

(30) Foreign Application Priority Data

Jul. 20, 2020 (JP) ................................. 2020-123493

(51) Int. Cl.
*F16H 15/38* (2006.01)
*F16H 57/04* (2010.01)

(52) U.S. Cl.
CPC ........... *F16H 15/38* (2013.01); *F16H 57/049* (2013.01)

(58) Field of Classification Search
CPC .............................. F16H 15/38; F16H 57/049
USPC ........................................................... 476/46
See application file for complete search history.

(56) References Cited

U.S. PATENT DOCUMENTS 3,486,391 A  *  12/1969  Kraus ..................... F16H 15/38
476/41

FOREIGN PATENT DOCUMENTS

| JP | 60252862 A | * 12/1985 |
| JP | 2001-289297 A | 10/2001 |
| JP | 2003-301910 A | 10/2003 |
| JP | 2008-094156 A | 4/2008 |

(Continued)

OTHER PUBLICATIONS

International Search Report for PCT/JP2021/026703, dated Aug. 31, 2021.

*Primary Examiner* — William C Joyce
(74) *Attorney, Agent, or Firm* — Sughrue Mion, PLLC

(57) ABSTRACT

A toroidal continuously variable transmission. A power roller (40) of the transmission includes a power roller inner ring (50) sandwiched between both disks (1, 2), a power roller outer ring (60) provided in a trunnion (35) and rotatably supporting the power roller inner ring (50), and an inner ring hole (52) provided in the power roller inner ring (50) to extend in an axial direction of the power roller inner ring (50), in which an end surface hole (58) communicating with an inner ring hole (52) is provided in an inner end surface (54) of the power roller inner ring (50), and the end surface hole (58) is closed by a closing member (80) separate from the power roller inner ring (50).

9 Claims, 17 Drawing Sheets

(56) References Cited

FOREIGN PATENT DOCUMENTS

| | | |
|---|---|---|
| JP | 2009-115203 A | 5/2009 |
| JP | 2013-024311 A | 2/2013 |
| JP | 2016-079996 A | 5/2016 |

\* cited by examiner

[FIG. 1]
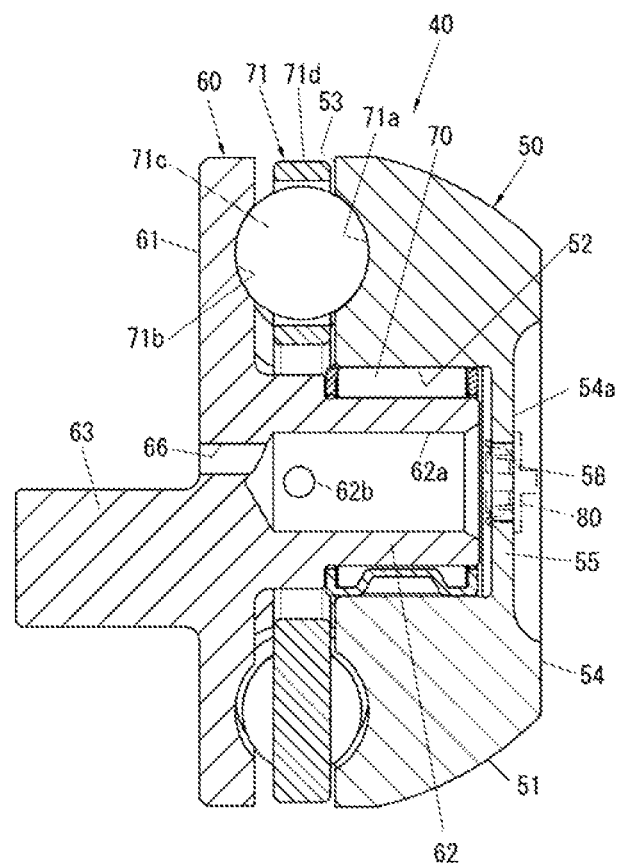

[FIG. 2]
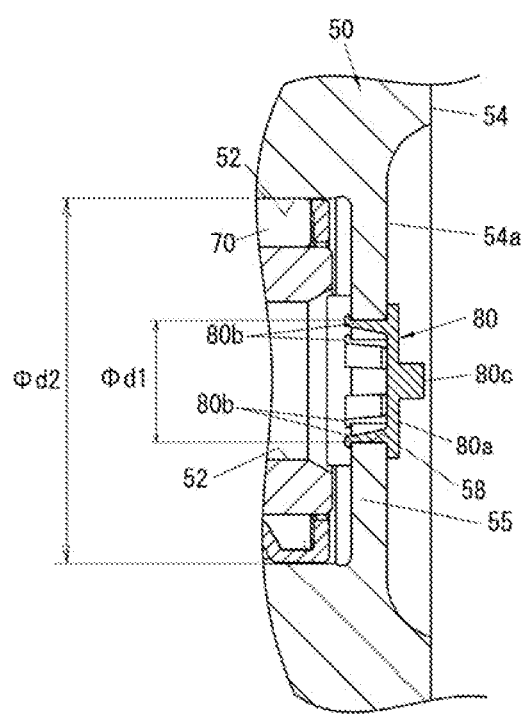

[FIG. 3]
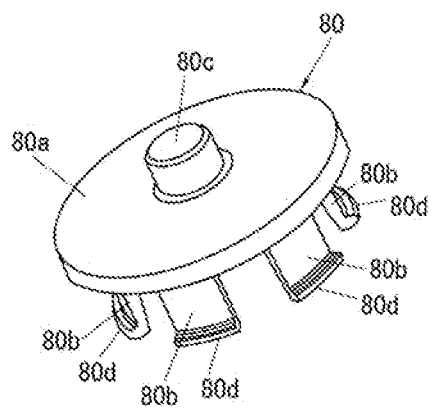
[FIG. 4]
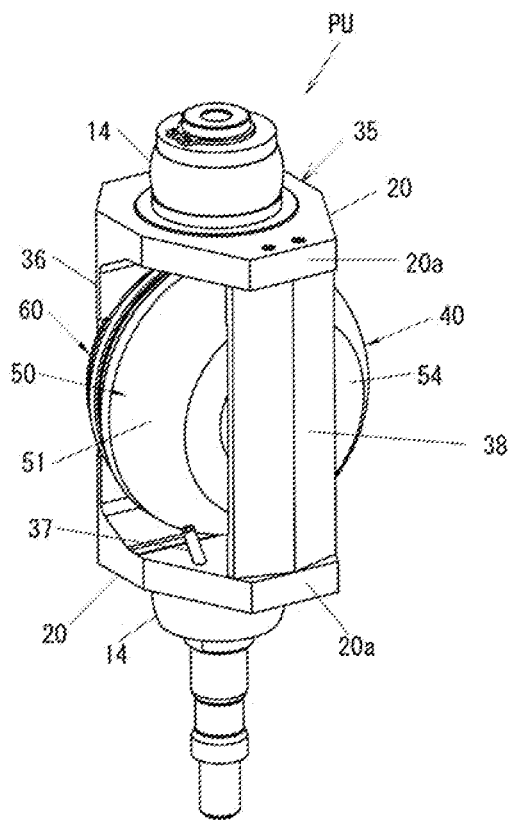

[FIG. 5]
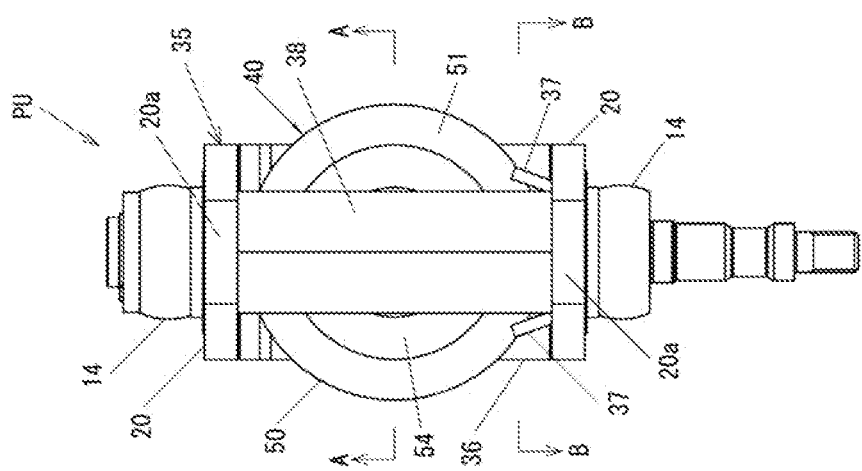

[FIG. 6]
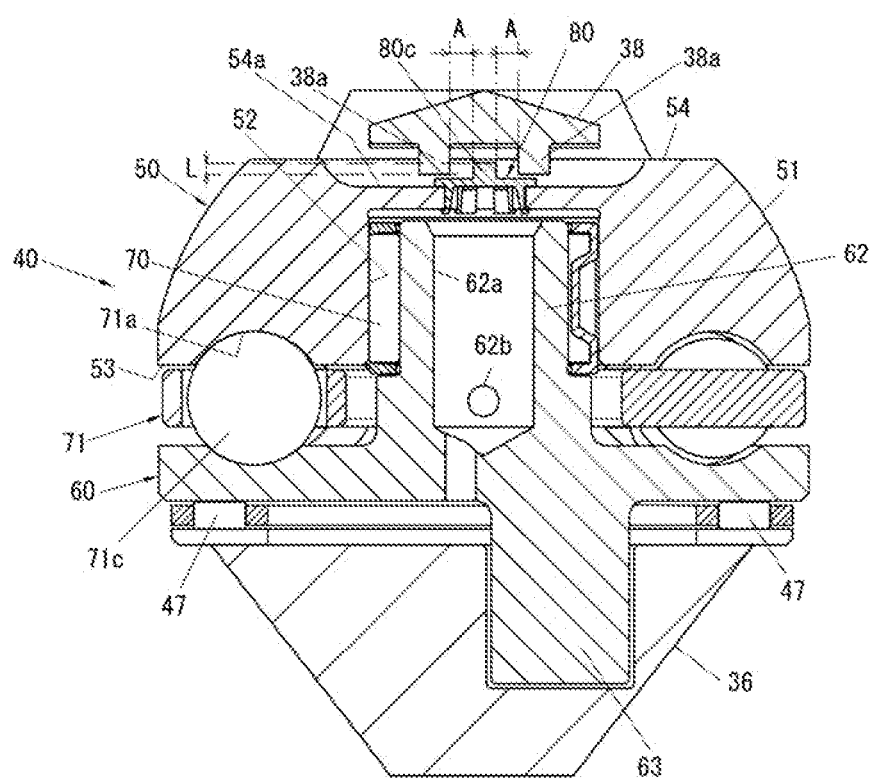

[FIG. 7]
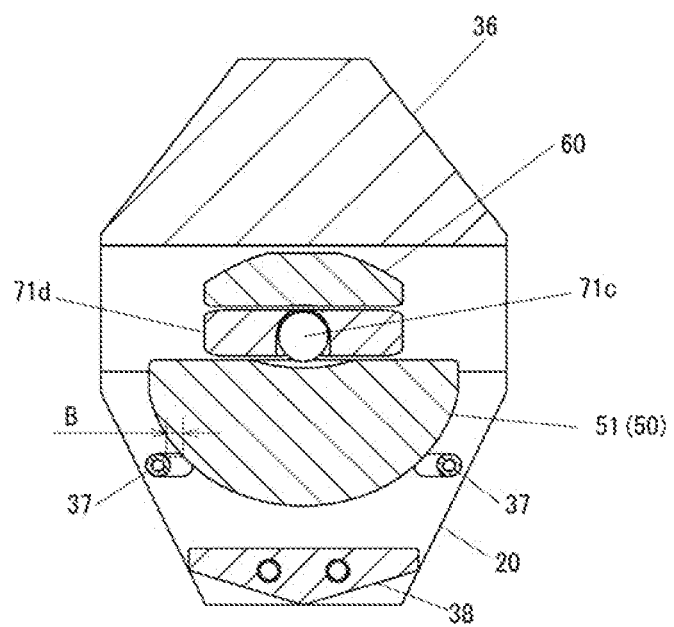

[FIG. 8]
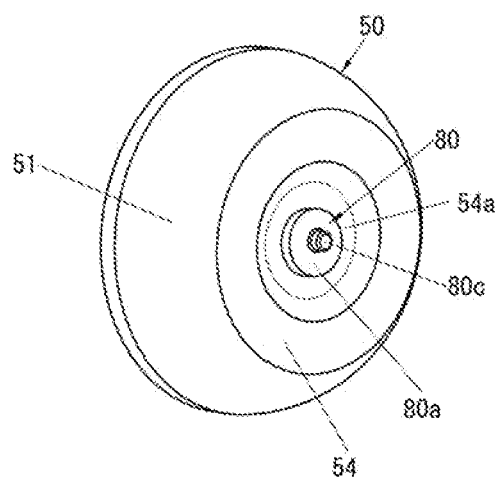
[FIG. 9]
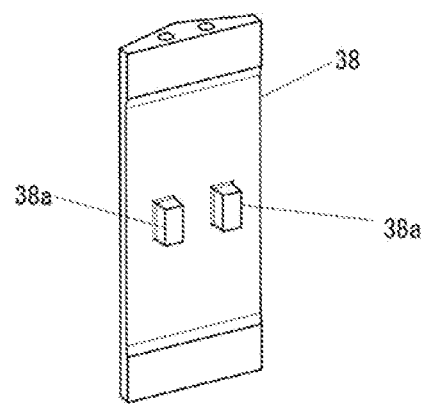

[FIG. 10]
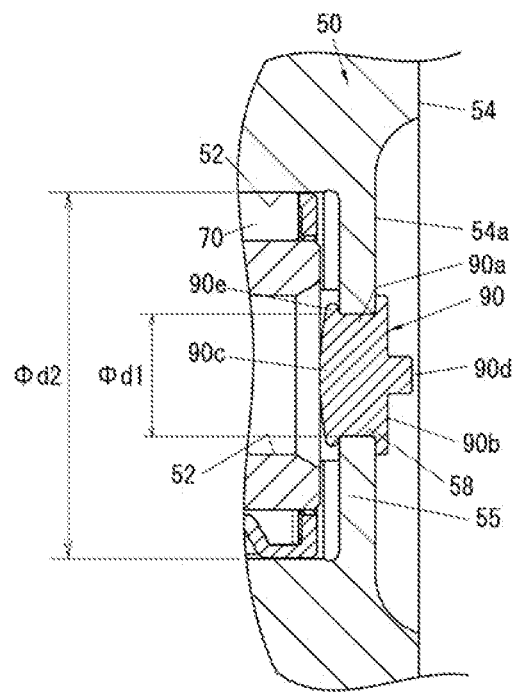

[FIG. 11]
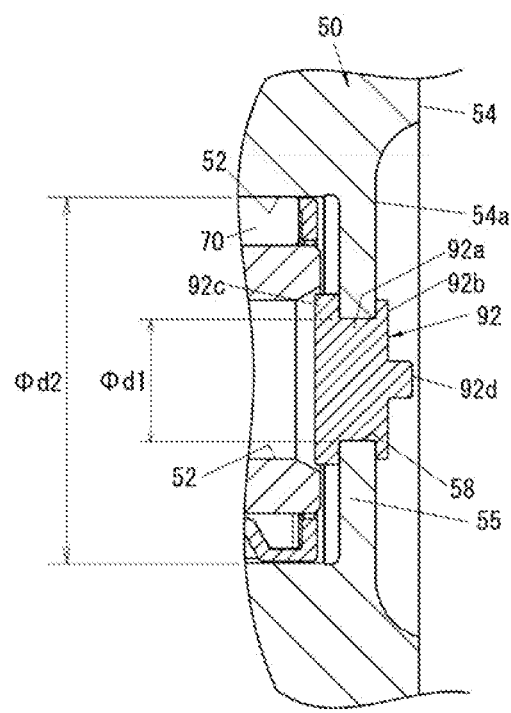

[FIG 12]
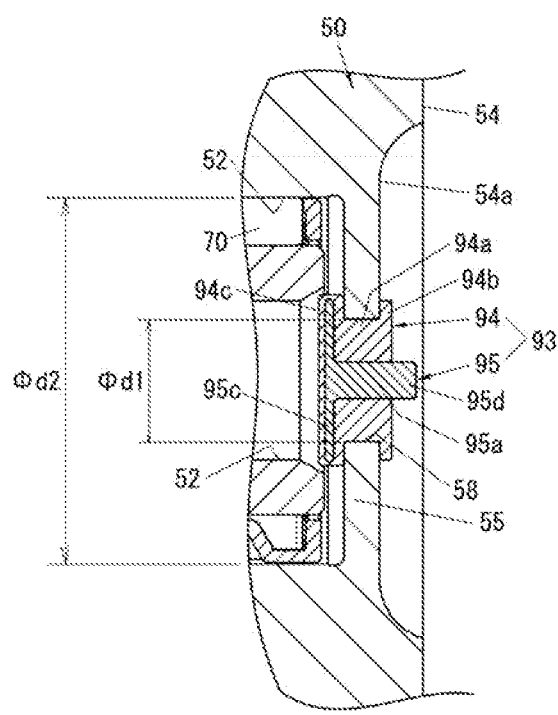

[FIG. 13]
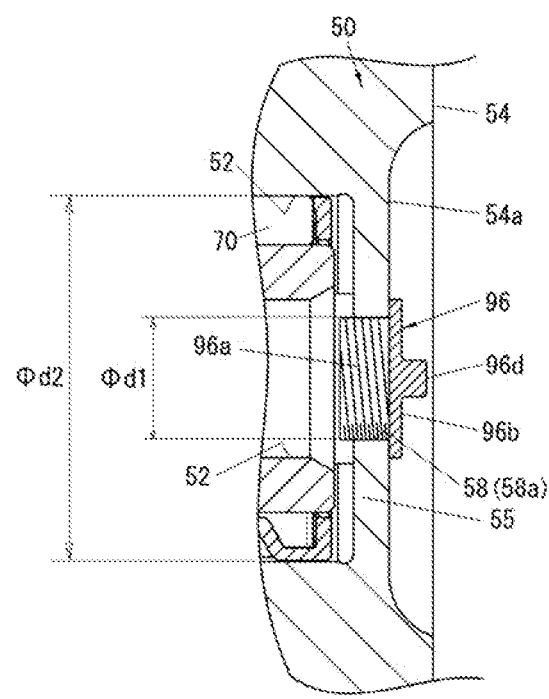

[FIG. 14]
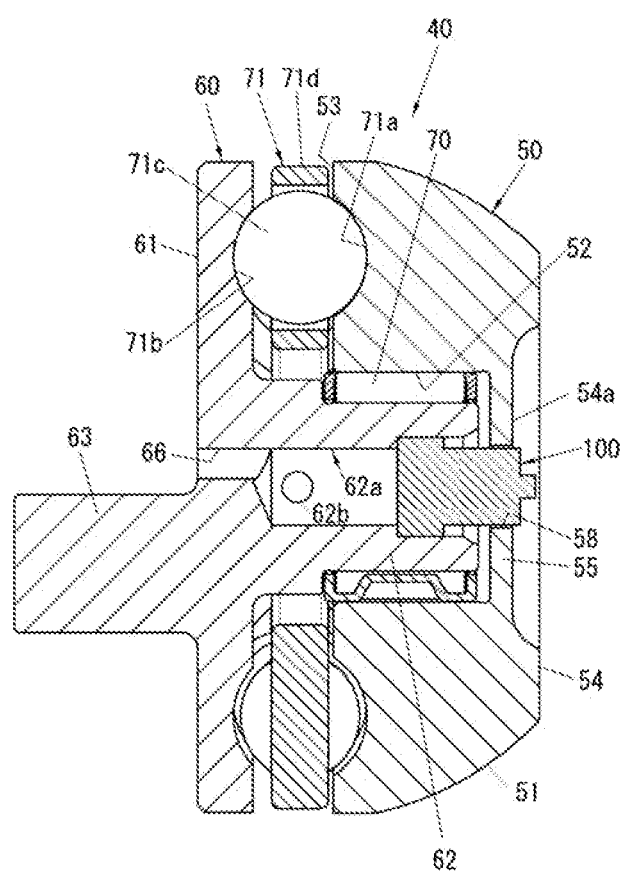

[FIG. 15]
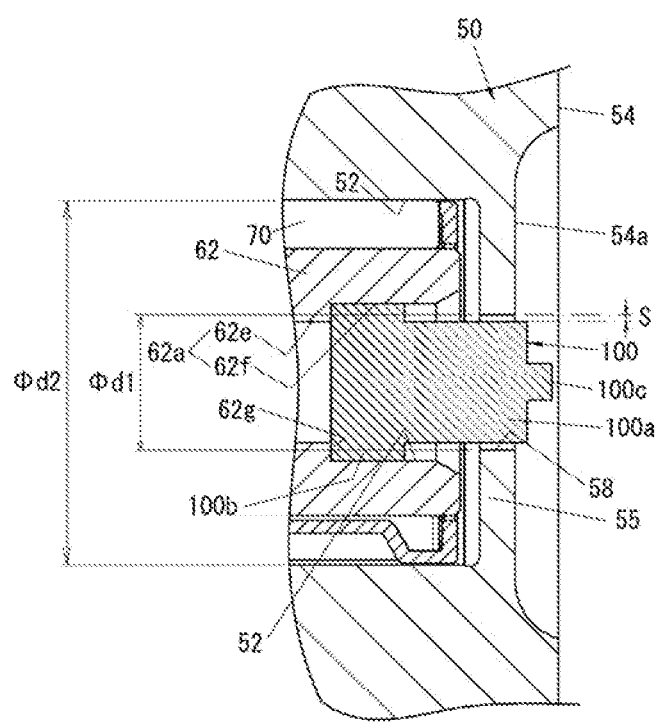

[FIG. 16]
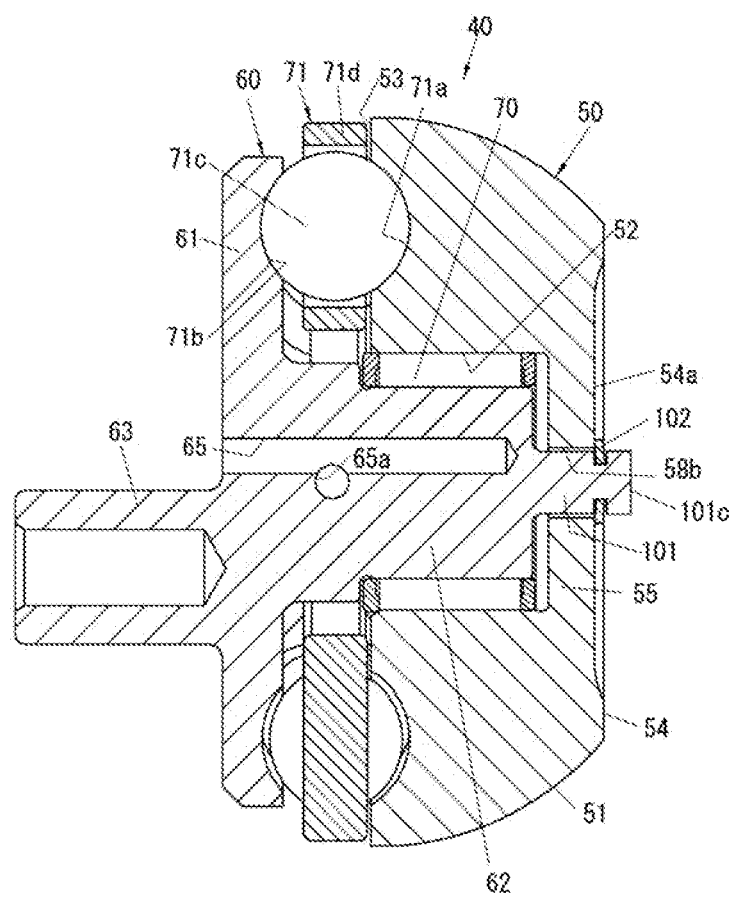

[FIG. 17]
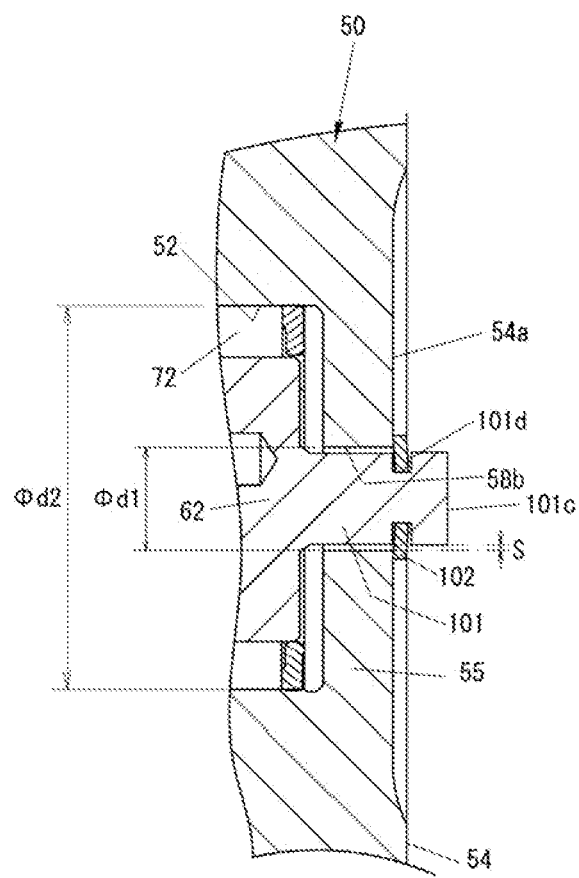

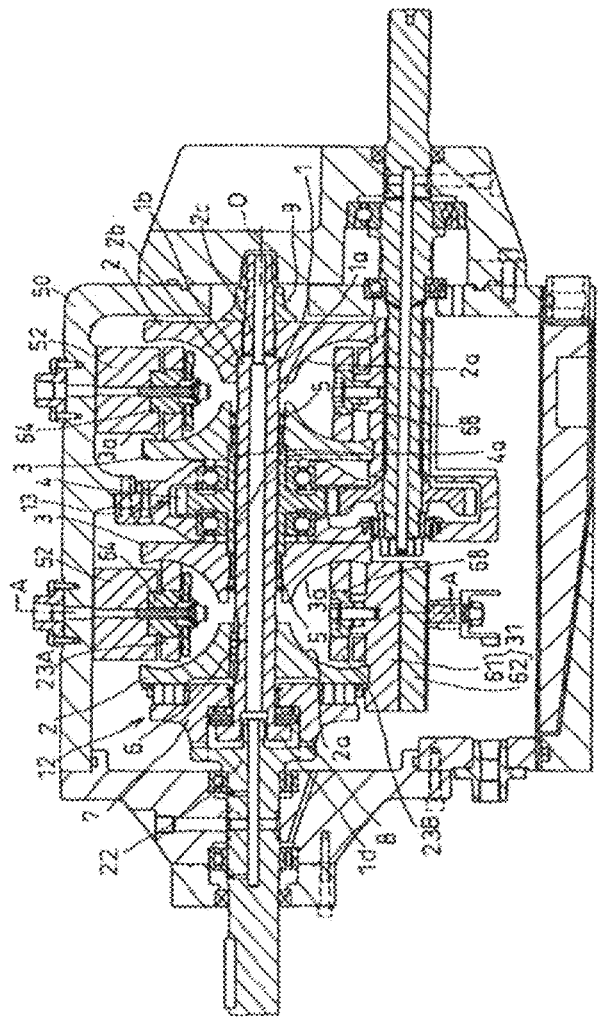
[FIG. 18] PRIOR ART

PRIOR ART
[FIG. 19]
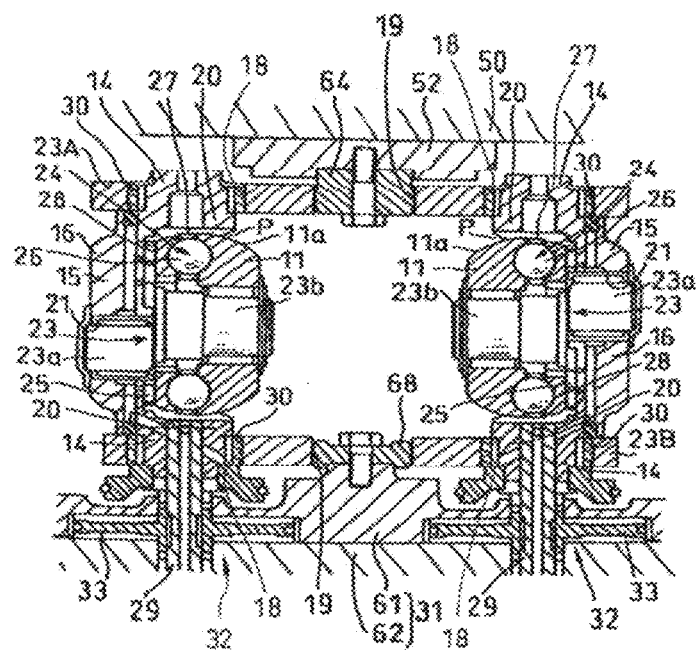

TOROIDAL CONTINUOUSLY VARIABLE TRANSMISSION

CROSS REFERENCE TO RELATED APPLICATIONS

This application is a National Stage of International Application No. PCT/JP2021/026703 filed Jul. 15, 2021, claiming priority based on Japanese Patent Application No. 2020-123493 filed Jul. 20, 2020.

TECHNICAL FIELD

The present invention relates to a toroidal continuously variable transmission that can be used for a generator of an automobile, an aircraft, a transmission of various industrial machines, or the like.

BACKGROUND ART

For example, a double cavity toroidal continuously variable transmission used as an automobile transmission is formed as illustrated in FIGS. 18 and 19. As illustrated in FIG. 18, an input shaft 1 is rotatably supported inside a casing 50, and two input side disks 2 and 2 and two output side disks 3 and 3 are attached to the outer periphery of the input shaft 1. Furthermore, an output gear (transmission gear) 4 is rotatably supported on the outer periphery of the intermediate portion of the input shaft 1. The output side disks 3 and 3 are connected to cylindrical flange portions 4a and 4a provided at the center portion of the output gear 4 by spline coupling.

The input shaft 1 is rotationally driven by a drive shaft 22 via a loading cam type pressing device 12 provided between an input side disk 2 located on the left part in FIG. 18 and a cam plate (loading cam) 7. Furthermore, the output gear 4 is supported in the casing 50 via a partition wall 13 formed by two members being coupled, and thus the output gear 4 can rotate about an axis O of the input shaft 1, and is prevented from being displaced in the axis O direction.

The output side disks 3 and 3 are rotatably supported about the axis O of the input shaft 1 by needle bearings 5 and 5 interposed between the output side disks 3 and 3 and the input shaft 1. Furthermore, the input side disk 2 on the left part in FIG. 18 is supported by the input shaft 1 via a ball spline 6, an input side disk 2 on the right part in FIG. 18 is spline-coupled to the input shaft 1, and these input side disks 2 rotate together with the input shaft 1. Furthermore, power rollers 11 (see FIG. 19) are rotatably sandwiched between inner surfaces (recessed surfaces; also referred to as traction surfaces) 2a and 2a of the input side disks 2 and 2 and inner surfaces (recessed surfaces; also referred to as traction surfaces) 3a and 3a of the output disks 3 and 3.

A stepped portion 2b is provided on an inner peripheral surface 2c of the input side disk 2 located on the right part in FIG. 18, and a stepped portion 1b provided on an outer peripheral surface 1a of the input shaft 1 abuts on the stepped portion 2b, and the back surface (right surface in FIG. 18) of the input side disk 2 abuts on a loading nut 9 screwed to a screw portion formed on the outer peripheral surface of the input shaft 1. As a result, displacement of the input side disk 2 in the axis O direction with respect to the input shaft 1 is substantially prevented. Furthermore, a disc spring 8 is provided between the cam plate 7 and a flange 1d of the input shaft 1, and the disc spring 8 applies a pressing force (preload) to abutting portions between the recessed surfaces 2a, 2a, 3a, and 3a of the respective disks 2, 2, 3, and 3 and peripheral surfaces 11a and 11a of the power rollers 11 and 11.

FIG. 19 is a cross-sectional view taken along line A-A of FIG. 18. As illustrated in FIG. 19, a pair of trunnions 15 and 15 that swing about a pair of pivot shafts 14 and 14 located at twisted positions with respect to the input shaft 1 is provided inside the casing 50. Note that the input shaft 1 is not illustrated in FIG. 11. Each of the trunnions 15 and 15 includes a pair of bent wall portions 20 and 20 formed in a state of being bent toward the inner surface of a support plate portion 16 at both ends in the longitudinal direction of the support plate portion 16 (vertical direction in FIG. 11). By the bent wall portions 20 and 20, a recessed pocket portion P for accommodating a power roller 11 is formed in each of the trunnions 15 and 15. Furthermore, on the outer surfaces of the bent wall portions 20 and 20, the pivot shafts 14 and 14 are concentrically provided, respectively.

A circular hole 21 is formed in the center portion of the support plate portion 16, and a base end portion 23a of a displacement shaft 23 is supported by the circular hole 21. By each of the trunnions 15 and 15 being swung about the respective pivot shafts 14 and 14, the inclination angle of the displacement shaft 23 supported by the center portion of each of the trunnions 15 and 15 can be adjusted. Furthermore, each of the power rollers 11 is rotatably supported around a distal end portions 23b of the displacement shafts 23 protruding from the inner surface of each of the trunnions 15 and 15, and each of the power rollers 11 and 11 is sandwiched between the respective input side disks 2 and 2 and the respective output side disks 3 and 3. Note that the base end portion 23a and the distal end portion 23b of each of the displacement shafts 23 and 23 are eccentric to each other.

Furthermore, the pivot shafts 14 and 14 of each of the trunnions 15 and 15 are supported to be swingable with respect to a pair of yokes 23A and 23B and to be displaceable in the axial direction (vertical direction in FIG. 11), and each of the yokes 23A and 23B restricts the movement of the trunnions 15 and 15 in the horizontal direction. Each of the yokes 23A and 23B is formed in a rectangular shape by press working or forging of metal such as steel. Four circular support holes 18 are provided in four corners of the yokes 23A and 23B, and the support holes 18 swingably support the respective pivot shafts 14 provided at both ends of the trunnions 15 via radial needle bearings 30. Furthermore, circular locking holes 19 are provided in the center portions in the width direction of the yokes 23A and 23B (left-right direction in FIG. 11), and spherical posts 64 and 68 are internally fitted with the inner peripheral surfaces of the locking holes 19 as cylindrical surfaces. That is, an upper yoke 23A is swingably supported by a spherical post 64 supported by the casing 50 via a fixing member 52, and a lower yoke 23B is swingably supported by a spherical post 68 and an upper cylinder body 56 of a driving cylinder 31 supporting the spherical post 68.

Note that the displacement shafts 23 and 23 provided in the respective trunnions 15 and 15 are provided at positions 180 degrees opposite to each other with respect to the input shaft 1. Furthermore, the direction in which the distal end portions 23b of the displacement shafts 23 and 23 are eccentric with respect to the base end portions 23a is the same direction with respect to the rotation direction of both disks 2, 2, 3, and 3 (upside down direction in FIG. 19). Furthermore, the eccentric direction is a direction substantially orthogonal to the arrangement direction of the input shaft 1. Therefore, the power rollers 11 and 11 are supported such that slight displacement in the longitudinal direction of the input shaft 1 is possible. As a result, even in a case where the power rollers 11 and 11 tend to be displaced in the axial direction of the input shaft 1 due to elastic deformation or the like of each component based on a thrust load generated by the pressing device 12, an excessive force is not applied to each component, and the displacement is absorbed.

Furthermore, between the outer surfaces of the power rollers 11 and the inner surfaces of the support plate portions 16 of the trunnions 15, thrust ball bearings (thrust bearings) 24 that are thrust rolling bearings and thrust needle bearings 25 are provided in order from the outer surfaces of the power rollers 11. Among these, the thrust ball bearings 24 allow the rotation of the power rollers 11 while supporting a load in a thrust direction applied to the power rollers 11. Each of such thrust ball bearings 24 includes a plurality of balls (hereinafter, referred to as rolling elements) 26 and 26, an annular retainer 27 that rollably holds the rolling elements 26 and 26, and an annular outer ring 28. Furthermore, the inner ring tracks of the thrust ball bearings 24 are formed on the outer surfaces (large end surfaces) of the power rollers 11, and the outer ring tracks are formed on the inner surfaces of outer rings 28.

Furthermore, the thrust needle bearings 25 are sandwiched between the inner surfaces of the support plate portions 16 of the trunnions 15 and the outer surfaces of the outer rings 28. Such thrust needle bearings 25 allow the power rollers 11 and the outer rings 28 to swing about the base end portions 23*a* of the displacement shafts 23 while supporting a thrust load applied from the power rollers 11 to the outer rings 28.

Furthermore, driving rods (trunnion shafts) 29 and 29 are provided at one end portions of the trunnions 15 and 15 (lower end portions in FIG. 19), respectively, and driving pistons (hydraulic pistons) 33 and 33 are fixed to the outer peripheral surfaces of the intermediate portions of the driving rods 29 and 29, respectively. The driving pistons 33 and 33 are oil-tightly fitted in the driving cylinder 31 including the upper cylinder body 56 and a lower cylinder body 57. The driving pistons 33 and 33 and the driving cylinder 31 form a driving device 32 that displaces the trunnions 15 and 15 in the axial direction of the pivot shafts 14 and 14 of the trunnions 15 and 15.

In a case of the toroidal continuously variable transmission formed as described above, rotation of the input shaft 1 is transmitted to the input side disks 2 and 2 via the pressing device 12. Then, rotation of the input side disks 2 and 2 are transmitted to the output side disks 3 and 3 via the pair of power rollers 11 and 11, and rotation of the output side disks 3 and 3 are taken out from the output gear 4.

In a case where the rotational speed ratio between the input shaft 1 and the output gear 4 is changed, a pair of the driving pistons 33 and 33 is displaced in opposite directions to each other. With the displacement of the driving pistons 33 and 33, the pair of the trunnions 15 and 15 are displaced in opposite directions to each other. For example, a power roller 11 on the left part of FIG. 19 is displaced downward in the drawing, and a power roller 11 on the right part of the drawing is displaced upward in the drawing.

As a result, the directions of tangential forces acting on the abutting portions between the peripheral surfaces 11*a* and 11*a* of the power rollers 11 and 11 and the inner surfaces 2*a*, 2*a*, 3*a*, and 3*a* of the input side disks 2 and 2 and the output side disks 3 and 3 change. With the change in the directions of the forces, the trunnions 15 and 15 swing (tilt) in the opposite directions to each other about the pivot shafts 14 and 14 pivotally supported by the yokes 23A and 23B.

As a result, the abutting positions between the peripheral surfaces 11*a* and 11*a* of the power rollers 11 and 11 and the inner surfaces 2*a* and 3*a* change, and the rotational speed ratio between the input shaft 1 and the output gear 4 changes. Furthermore, when torque transmitted between the input shaft 1 and the output gear 4 fluctuates and the elastic deformation amount of each component changes, the power rollers 11 and 11 and the outer rings 28 and 28 attached to the power rollers 11 and 11 slightly rotate about the base end portions 23*a* and 23*a* of the displacement shafts 23 and 23. Since the thrust needle bearings 25 and 25 exist between the outer surfaces of the outer rings 28 and 28 and the inner surfaces of the support plate portions 16 included in the trunnions 15 and 15, the rotation is smoothly performed. Therefore, as described above, a force for changing the inclination angles of the displacement shafts 23 and 23 can be reduced.

As examples of such a toroidal continuously variable transmission, for example, toroidal continuously variable transmissions described in Patent Literature 1 to 3 are known.

In a toroidal continuously variable transmission described in Patent Literature 1, an inner ring hole of a power roller inner ring is closed at the end surface opposite to a power roller outer ring. As a result, lubricating oil supplied to a ball bearing or the like arranged between the power roller inner ring and the power roller outer ring can be effectively supplied to the bearing without leaking from the distal end of the power roller inner ring, and smooth rotational motion of the power roller inner ring can be secured.

In a toroidal continuously variable transmission described in Patent Literature 2, a distal end protruding portion of a shaft portion separately assembled to a power roller outer ring is engaged with a recessed groove formed in the inner surface of the center portion of a trunnion, and a base end portion of the shaft portion is inserted into a center hole (inner ring hole) provided in the power roller inner ring with a radial needle bearing interposed therebetween. The center hole (inner ring hole) opens to the end surface side of the power roller inner ring.

A toroidal continuously variable transmission described in Patent Literature 3 includes a reinforcing member that is arranged on an end surface side of a power roller and reinforces a trunnion by both end portions being fixed to the trunnion, and an abutting portion provided on the end surface of the power roller, in which the reinforcing member includes a restricting portion that is abutted on by the abutting portion to restrict further movement of the power roller in a case where the power roller move by a predetermined distance in a direction orthogonal to a rotation axis of the power roller.

In a conventional toroidal continuously variable transmission, an inner ring hole into which a support shaft for rotatably supporting the power roller inner ring (outer ring shaft of a power roller outer ring) is inserted is provided in the center portion of the power roller inner ring.

In conventional toroidal continuously variable transmissions described in FIG. 19 and Patent Literature 2, an inner ring hole of a power roller inner ring is opened to both end surfaces of the power roller inner ring in order to ensure processability (for example, to ensure dischargeability of chips in a case of forming the inner ring hole by cutting processing) and to ensure conveyability of the power roller inner ring (for example, in a case where the inner ring of a power roller is conveyed, a conveyance arm is locked to an inner ring hole of the inner ring of the power roller without being brought into contact with a traction surface), and a support shaft integral with or separate from a power roller outer ring is inserted into such an inner ring hole such that the end portion protrudes from the inner end surface of the power roller inner ring (end surface opposite to the power roller outer ring), and the protrusion portion is fixed to the inner end surface by a retaining ring.

Furthermore, in conventional toroidal continuously variable transmissions described in Patent Literature 1 and 3, an inner ring hole provided in the center portion of a power roller inner ring is not opened to the inner end surface of the power roller inner ring. In this way, oil leakage from the inner end surfaces of the power roller inner rings can be prevented, and rigidity of the power roller inner rings can be enhanced.

CITATION LIST

Patent Literature

Patent Literature 1: JP 2001-289297 A
Patent Literature 2: JP 2013-24311 A
Patent Literature 3: JP 2016-79996 A

SUMMARY OF INVENTION

Technical Problem

As described above, in a toroidal continuously variable transmission, if an inner ring hole provided in the center portion of a power roller inner ring is opened to the inner end surface of the power roller inner ring, that is, if the inner ring hole is a through hole penetrating in the axial direction of the power roller inner ring, processability and conveyability can be secured, but oil leaks from the inner end surface of the power roller inner ring, the amount of oil supplied to a bearing inside a power roller decreases, and also the rigidity of the power roller decreases due to the through hole.

The present invention has been made in view of the above circumstances, and an object of the present invention is to provide a toroidal continuously variable transmission capable of securing processability and conveyability of a power roller inner ring while reducing oil leakage from the inner end surface of the power roller inner ring and a decrease in rigidity of the power roller inner ring.

Solution to Problem

In order to achieve the above object, a toroidal continuously variable transmission according to the present invention is a toroidal continuously variable transmission including an input side disk and an output side disk that are concentrically and rotatably provided with inner surfaces facing each other, a power roller sandwiched between both disks, and a trunnion that rotatably supports the power roller and is tilted about pivot shafts that are at twisted positions with respect to central axes of the input side disk and the output side disk, in which the power roller includes a power roller inner ring sandwiched between the both disks, a power roller outer ring that is provided in the trunnion and rotatably supports the power roller inner ring, and an inner ring hole provided in the power roller inner ring so as to extend in an axial direction of the power roller inner ring, and an end surface hole communicating with the inner ring hole is provided in an inner end surface of the power roller inner ring, and the end surface hole is closed by a closing member separate from the power roller inner ring.

Here, when the end surface hole is closed by the closing member, completely preventing oil leakage from the end surface hole is not necessary, and oil leakage from the end face hole is only required to be reduced such that the amount of oil supplied to a bearing inside the power roller is sufficient.

In the present invention, since the end surface hole communicating with the inner ring hole is provided in the inner end surface of the power roller inner ring, processability and conveyability of the power roller inner ring can be secured. Furthermore, since the end surface hole provided in the inner end surface of the power roller inner ring is closed by the closing member, oil leakage from the inner end surface of the power roller inner ring and a decrease in rigidity of the power roller inner ring can be reduced. In this manner, processability and conveyability of the power roller inner ring can be ensured while oil leakage from the inner end surface of the power roller inner ring and a decrease in rigidity of the power roller inner ring are reduced.

In the configuration of the present invention, the closing member may be fixed to the power roller inner ring.

According to such a configuration, since the closing member is fixed to the power roller inner ring, the closing member can be prevented from deviating from the end surface hole. Furthermore, since the closing member rotates together with the power roller inner ring with rotation of the power roller inner ring, the rotation of the power roller inner ring does not cause sliding between the end surface hole and the closing member, and wear of the end surface hole and the closing member can be prevented.

Furthermore, in the configuration of the present invention, the closing member may be fixed to the power roller outer ring.

According to such a configuration, since the closing member is fixed to the power roller outer ring, the closing member can be prevented from deviating from the end surface hole. Furthermore, since the closing member does not rotate with rotation of the power roller inner ring, as described below, in a case where an abutting portion is provided in a closing member main body and a reinforcing member that reinforces the trunnion includes a restricting portion that is abutted on by the abutting portion to restrict further movement of the power roller when the power roller moves by a predetermined distance in the direction orthogonal to the rotation axis of the power roller, the abutting portion only abuts on the restricting portion without rotating, and thus wear of the abutting portion and the restricting portion can be reduced.

Furthermore, in the configuration of the present invention, the power roller outer ring may include an outer ring shaft that is inserted into the inner ring hole and rotatably supports the power roller inner ring, and a distal end portion of the outer ring shaft may be the closing member that closes the end surface hole.

According to such a configuration, since the distal end portion of the outer ring shaft is the closing member, the end surface hole of the power roller inner ring can be closed, without a closing member being separately prepared, by the power roller inner ring being assembled to the power roller outer ring.

Furthermore, in the configuration of the present invention, the power roller outer ring may include an outer ring shaft that is inserted into the inner ring hole and rotatably supports the power roller inner ring, and a gap between an inner peripheral surface of the end surface hole and an outer peripheral surface of the closing member may be larger than a bearing effective gap in a radial direction of a bearing provided between an inner peripheral surface of the inner ring hole and an outer peripheral surface of the outer ring shaft.

According to such a configuration, even when the power roller inner ring moves in the radial direction in the bearing effective gap of the bearing with the rotation, the closing member fixed to the power roller outer ring does not hit the inner peripheral surface of the end surface hole of the rotating power roller inner ring. Therefore, wear of the closing member and the end surface hole can be prevented.

Furthermore, in the configuration of the present invention, a reinforcing member that is arranged on an inner end surface side of the power roller inner ring and reinforces the trunnion by both end portions being fixed to the trunnion may be further included, in which the closing member may include a closing member main body that closes the end surface hole and an abutting portion provided on a surface of the closing member main body facing the reinforcing member, and the reinforcing member may include a restricting portion that is abutted on by the abutting portion to restrict further movement of the power roller in a case where the power roller moves by a predetermined distance in a direction orthogonal to a rotation axis of the power roller.

Here, the predetermined distance means a distance in which other components are not interfered (collided) in a case where the power roller moves in the direction orthogonal to the rotation axis of the power roller, and a distance larger than a distance in which the power roller can move (swing) in the direction orthogonal to the rotation axis of the power roller in order to make the assembled toroidal continuously variable transmission function.

Furthermore, the abutting portion may be, for example, formed by a first protrusion provided on the inner end surface of the power roller, and the restricting portion may be formed by a pair of second protrusions that has a predetermined gap with respect to the first protrusion with the first protrusion interposed therebetween, and overlaps the first protrusion in the rotation axial direction of the power roller, alternatively, the restricting portion may be formed by a protrusion provided in the reinforcing member, and the abutting portion may be formed by a hole into which the protrusion is inserted with a predetermined gap.

According to such a configuration, during assembly of the toroidal continuously variable transmission or operation of the toroidal continuously variable transmission, in a case where the power roller moves by a predetermined distance in the direction orthogonal to the rotation axis of the power roller, the abutting portion that is the first protrusion located on the distal end surface of the closing member abuts on the restricting portion provided in the reinforcing member, and further movement of the power roller is restricted, and thus the power roller can be prevented from interfering with other components due to the further movement.

Furthermore, in a case where the closing member is fixed to the power roller outer ring, since the closing member does not rotate with rotation of the power roller inner ring, in a case where the power roller moves by a predetermined distance in the direction orthogonal to the rotation axis of the power roller during operation of the toroidal continuously variable transmission, the abutting portion only abuts on the restricting portion without rotating, and thus wear of the abutting portion and the restricting portion can be reduced.

Furthermore, in the configuration of the present invention, the inner diameter of the end surface hole may be smaller than the inner diameter of the inner ring hole.

According to such a configuration, oil leakage from the end surface of the power roller inner ring can be reduced as compared with a case where the inner ring hole penetrating in the axial direction is provided in the power roller inner ring.

Advantageous Effects of Invention

According to the present invention, processability and conveyability of a power roller inner ring can be ensured while oil leakage from the inner end surface of the power roller inner ring and a decrease in rigidity of the power roller inner ring are reduced.

BRIEF DESCRIPTION OF DRAWINGS

FIG. 1 is a view illustrating a power roller of a toroidal continuously variable transmission according to a first embodiment of the present invention, and is the cross-sectional view.

FIG. 2 is a view illustrating the power roller of the toroidal continuously variable transmission according to the first embodiment of the present invention, and is an enlarged cross-sectional view of a main part.

FIG. 3 is a view illustrating the power roller of the toroidal continuously variable transmission according to the first embodiment of the present invention, and is a perspective view of a closing member.

FIG. 4 is a view illustrating a power roller unit included in the toroidal continuously variable transmission according to the first embodiment of the present invention, and is the perspective view.

FIG. 5 is a view illustrating the power roller unit included in the toroidal continuously variable transmission according to the first embodiment of the present invention, and is the front view.

FIG. 6 is a view illustrating the power roller unit included in the toroidal continuously variable transmission according to the first embodiment of the present invention, and is a cross-sectional view taken along line A-A in FIG. 5.

FIG. 7 is a view illustrating the power roller unit included in the toroidal continuously variable transmission according to the first embodiment of the present invention, and is a cross-sectional view taken along line B-B in FIG. 5.

FIG. 8 is a view illustrating the power roller unit included in the toroidal continuously variable transmission according to the first embodiment of the present invention, and is a perspective view illustrating a power roller inner ring.

FIG. 9 is a view illustrating the power roller unit included in the toroidal continuously variable transmission according to the first embodiment of the present invention, and is a perspective view illustrating a reinforcing member.

FIG. 10 is a view illustrating the power roller of the toroidal continuously variable transmission according to the first embodiment of the present invention, and is an enlarged cross-sectional view of a main part of a first modification.

FIG. 11 is a view illustrating the power roller of the toroidal continuously variable transmission according to the first embodiment of the present invention, and is an enlarged cross-sectional view illustrating a main part of a second modification.

FIG. 12 is a view illustrating the power roller of the toroidal continuously variable transmission according to the first embodiment of the present invention, and is an enlarged cross-sectional view illustrating a main part of a third modification.

FIG. 13 is a view illustrating the power roller of the toroidal continuously variable transmission according to the first embodiment of the present invention, and is an enlarged cross-sectional view illustrating a main part of a fourth modification.

FIG. 14 is a view illustrating a power roller of a toroidal continuously variable transmission according to a second embodiment of the present invention, and is the cross-sectional view.

FIG. 15 is a view illustrating the power roller of the toroidal continuously variable transmission according to the second embodiment of the present invention, and is an enlarged cross-sectional view of a main part.

FIG. 16 is a view illustrating a power roller of a toroidal continuously variable transmission according to a third embodiment of the present invention, and is the cross-sectional view.

FIG. 17 is a view illustrating the power roller of the toroidal continuously variable transmission according to the third embodiment of the present invention, and is an enlarged cross-sectional view of a main part.

FIG. 18 is a cross-sectional view illustrating an example of a conventional toroidal continuously variable transmission.

FIG. 19 is a cross-sectional view taken along line A-A in FIG. 18.

DESCRIPTION OF EMBODIMENTS

Hereinafter, embodiments of the present invention will be described with reference to the drawings. Note that a toroidal continuously variable transmission according to the present embodiment is different from the conventional toroidal continuously variable transmission illustrated in FIGS. 18 and 19 mainly in a power roller configuration, in that a trunnion includes a reinforcing member, and in that the reinforcing member includes a restricting portion, and thus these points will be described below, and the other same components will be denoted by the same reference signs, and description thereof may be omitted or simplified.

First Embodiment

FIG. 1 is a cross-sectional view illustrating a power roller 40 of a double cavity toroidal continuously variable transmission according to a first embodiment, FIG. 2 is a cross-sectional view of a main part, and FIG. 3 is a perspective view of a closing member.

As illustrated in FIG. 1, the power roller 40 includes a power roller inner ring 50 and a power roller outer ring 60.

An outer peripheral surface 51 of the power roller inner ring 50 is sandwiched between an input side disk 2 and an output side disk 3 (see FIG. 18), and an inner ring hole 52 is provided in the center portion to extend in the axial direction of the power roller inner ring 50 (left-right direction in FIG. 1). The inner ring hole 52 is formed in a cylindrical surface having the rotation axis of the power roller inner ring 50 as an axis, and a base end portion of the inner ring hole 52 (left end portion in FIG. 1) opens to the center portion of an outer end surface (left end surface in FIG. 1) 53 facing the power roller outer ring 60. Furthermore, the distal end portion of the inner ring hole 52 (right end portion in FIG. 1) is not opened to an inner end surface 54 of the power roller inner ring 50 (right end surface in FIG. 1).

Furthermore, the inner end surface 54 of the power roller inner ring 50 includes a recessed portion 54a having a circular shape as viewed in the axial direction at the center portion. The recessed portion 54a is provided coaxially with the power roller inner ring, and a disk-shaped wall portion 55 is provided between the bottom surface of the recessed portion 54a and the bottom surface of the inner ring hole 52. An end surface hole 58 communicating with the inner ring hole 52 is provided through the wall portion 55 at the center portion of the bottom surface of the recessed portion 54a. The end surface hole 58 is formed in a circular shape and has a smaller diameter than the inner ring hole 52.

Provided that the inner diameter of the end surface hole 58 is $\Phi d1$ and the inner diameter of the inner ring hole 52 is $\Phi d2$, $\Phi d1 < \Phi d2$ is satisfied. That is, the inner diameter of the end surface hole 58 is smaller than the inner diameter of the inner ring hole 52.

Also, in first to fourth modifications, a second embodiment, and a third embodiment to be described below, the inner diameter of the end surface hole 58 (58b) is smaller than the inner diameter of the inner ring hole 52.

The power roller outer ring 60 includes a disk-shaped outer ring main body 61 and support shafts 62 and 63 provided integrally with the outer ring main body 61. A support shaft (outer ring shaft) 62 is erected coaxially with the inner ring hole 52 on the inner end surface of the outer ring main body 61 facing the power roller inner ring 50. A support shaft 63 is eccentric to the support shaft 62 and erected in parallel to the support shaft 62 on the outer end surface of the outer ring main body 61 facing the side opposite to the power roller inner ring 50. The support shaft 63 is inserted into a circular hole 21 provided in the support plate portion 16 of the trunnion 15 (see FIG. 19).

Furthermore, the support shaft 62 includes an oil hole 62a that is extending in the axial direction and opens to the distal end surface of the support shaft 62 at the center portion. An introduction hole 66 for introducing lubricating oil into the oil hole 62a is provided in the bottom portion of the oil hole 62a so as to penetrate the outer ring main body 61 in the thickness direction. Lubricating oil is supplied to the introduction hole 66 from an oil passage (not illustrated) provided in a trunnion 35.

Furthermore, a plurality of discharge holes 62b is provided at predetermined intervals in the circumferential direction in the outer peripheral surface of the bottom portion of the oil hole 62a, and the discharge holes 62b radially discharge the lubricating oil supplied to the oil hole 62a outward from the support shaft 62. The lubricating oil discharged from the discharge holes 62b is supplied to a thrust rolling bearing 71 arranged outside the discharge holes.

Furthermore, the lubricating oil supplied to the oil hole 62a flows toward the inner end surface 54 of the power roller inner ring 50, but since the end surface hole 58 provided in the inner end surface 54 is closed by a closing member 80 as described below, the lubricating oil flows radially outward at the distal end opening of the oil hole 62a, is supplied to the radial needle bearing 70, further passes through a radial needle bearing 70, and is supplied to the thrust rolling bearing 71.

Furthermore, the radial needle bearing 70 is provided between the inner peripheral surface of the inner ring hole 52 of the power roller inner ring 50 and the outer peripheral surface of the support shaft 62 of the power roller outer ring 60, and the radial needle bearing 70 allows the power roller inner ring 50 to rotate about the support shaft 62.

Furthermore, the thrust rolling bearing 71 is provided between the power roller inner ring 50 and the power roller outer ring 60. The thrust rolling bearing 71 allows rotation of the power roller inner ring 50 while supporting a load in the thrust direction applied to the power roller inner ring 50, and includes an inner ring track 71*a* provided on the outer end surface of the power roller inner ring 50, an outer ring track 71*b* provided on the inner end surface of the outer ring main body 61 of the power roller outer ring 60, a plurality of balls (rolling elements) 71*c* that roll on the inner ring track 71*a* and the outer ring track 71*b*, and an annular retainer 71*d* that rollably holds the balls 71*c*.

Furthermore, the end surface hole 58 provided through the wall portion 55 at the center portion of the bottom surface of the recessed portion 54*a* of the power roller inner ring 50 is closed by the closing member 80 separate from the power roller inner ring 50.

As illustrated in FIGS. 2 and 3, the closing member 80 is formed from resin, and includes a disk-shaped closing member main body 80*a*, a plurality of claws 80*b* formed integrally with the closing member main body 80*a* on one surface of the closing member main body 80*a*, and a first protrusion (abutting portion) 80*c* formed integrally with the closing member main body 80*a* on the other surface of the closing member main body 80*a*.

The closing member main body 80*a* is formed to have a larger diameter than the end surface hole 58 provided in the power roller inner ring 50, and closes the end surface hole 58.

Each of the claws 80*b* is formed to extend in the axial direction from the one surface of the closing member main body 80*a*, and includes a locking portion 80*d* protruding outward (radially outward of the closing member main body 80*a*) at the distal end portion. Furthermore, the claws 80*b* are formed in arc plates along the inner peripheral surface of the end surface hole 58, and are provided at predetermined intervals in the circumferential direction inside the outer peripheral edge of the one surface of the closing member main body 80*a*.

The first protrusion 80*c* is formed in a columnar shape and protrudes in the axial direction at the center portion of the other surface of the closing member main body 80*a*. Furthermore, the length in the axial direction of the first protrusion 80*c* is set to such a length that the first protrusion 80*c* does not protrude from the recessed portion 54*a* provided in the inner end surface 54 of the power roller inner ring 50 when the closing member 80 is attached to the end surface hole 58, that is, such a length that is lower than the inner end surface 54.

Such a closing member 80 is attached so as to be inserted into the end surface hole 58 from the recessed portion 54*a* of the power roller inner ring 50, and in the attached state, the closing member main body 80*a* is in close contact with the bottom surface of the recessed portion 54*a* at one opening peripheral portion of the end surface hole 58, thereby the end surface hole 58 is closed. Furthermore, in the state where the closing member 80 is attached, the surfaces facing the outside of the claws 80*b* are in close contact with the inner peripheral surface of the end surface hole 58, and locking portions 80*d* at the distal ends of the claws 80*b* are locked to the back surface of the wall portion 55 at the other opening peripheral portion of the end surface hole 58. This prevents the closing member 80 attached to the end surface hole 58 from coming out of the end surface hole 58. Furthermore, since the locking portions 80*d* are locked to the back surface of the wall portion 55 at the other opening peripheral portion of the end surface hole 58, sealability of the end surface hole 58 is improved, and oil leakage can be prevented.

Furthermore, in the state where the closing member 80 is attached, the first protrusion 80*c* is arranged coaxially with the power roller inner ring 50 and does not protrude from the recessed portion 54*a*.

As described above, according to the present embodiment, since the end surface hole 58 communicating with the inner ring hole 52 is provided in the inner end surface 54 of the power roller inner ring 50, processability and conveyability of the power roller inner ring 50 can be secured. Furthermore, since the end surface hole 58 provided in the inner end surface 54 of the power roller inner ring 50 is closed by the closing member 80, oil leakage from the inner end surface 54 of the power roller inner ring 50 and a decrease in rigidity of the power roller inner ring 50 can be reduced. In this manner, processability and conveyability of the power roller inner ring 50 can be ensured while oil leakage from the inner end surface 54 of the power roller inner ring 50 and a decrease in rigidity of the power roller inner ring 50 are reduced.

Furthermore, since the closing member 80 is fixed to the power roller inner ring 50, the closing member 80 can be prevented from deviating from the end surface hole 58. Furthermore, since the closing member 80 rotates together with the power roller inner ring 50 with rotation of the power roller inner ring 50, the rotation of the power roller inner ring 50 does not cause sliding between the end surface hole 58 and the closing member 80, and wear of the end surface hole 58 and the closing member 80 can be prevented. Furthermore, since the closing member 80 is formed from resin, the weight is reduced, and the rotation of the power roller inner ring 50 is not adversely affected.

Furthermore, since the inner diameter of the end surface hole 58 is smaller than the inner diameter of the inner ring hole 52, oil leakage from the end surface of the power roller inner ring 50 can be reduced as compared with a case where the inner ring hole penetrating in the axial direction is provided in the inner ring of the conventional power roller 11 as illustrated in FIG. 19.

Note that similar effects can also be obtained in the first to fourth modifications, the second embodiment, and the third embodiment to be described below.

FIGS. 4 and 5 illustrate a power roller unit PU including the power roller 40, in which FIG. 4 is the perspective view, and FIG. 5 is the front view.

The power roller unit PU includes the trunnion 35, a reinforcing member 38, and the power roller 40.

The trunnion 35 includes a pair of bent wall portions 20 and 20 formed in a state of being bent toward the inner surface of a substantially rectangular plate-shaped support plate portion 36 included in the trunnion 35 at both ends in the longitudinal direction of the support plate portion 36 (vertical direction in FIGS. 4 and 5). Distal end portions 20*a* and 20*a* of the bent wall portions 20 and 20 protrude from the inner end surface 54 of the power roller inner ring 50 of the power roller 40. On the outer surfaces of the bent wall portions 20 and 20, pivot shafts 14 and 14 are concentrically provided, respectively. Furthermore, on a lower bent wall portion 20, lubricating oil injection pipes 37 and 37 for injecting lubricating oil toward the outer peripheral surface (traction surface) 51 of the power roller inner ring 50 are provided so as to be separated from each other in the left-right direction and protrude.

Furthermore, on the inner end surface 54 side of the power roller inner ring 50, the reinforcing member 38 that restricts the trunnion 35 from being elastically deformed in a direction in which the inner surface of the support plate portion 36 is a recessed surface is provided in parallel with the support plate portion 36.

The reinforcing member 38 extends so as to be bridged between the distal end portions 20a and 20a of the pair of bent wall portions 20 and 20, and both end portions are fixed to the distal end portions 20a and 20a of the bent wall portions 20 and 20. For example, the reinforcing member 38 is formed in a pentagonal shape in cross section extending vertically obtained by subjecting a material having sufficient rigidity such as steel to a process of obtaining high rigidity such as a forging process, and a surface facing the power roller 40 is formed in a rectangular shape.

Furthermore, as illustrated in FIG. 6, a thrust needle bearing 47 is provided between the outer end surface of the power roller outer ring 60 and the inner surface of the support plate portion 36, thereby allowing the power roller outer ring 60 to move (swing) in a direction orthogonal to the support shaft (outer ring shaft) 62 (left-right direction in FIG. 6).

As described above, the circular recessed portion 54a is provided in the center portion of the inner end surface 54 of the power roller inner ring 50, and the first protrusion (abutting portion) 80c of the closing member 80 that closes the end surface hole 58 provided in the bottom surface of the recessed portion 54a is provided. The distal end surface of the first protrusion 80c is at a position substantially equal to the inner end surface 54 or at a position recessed from the inner end surface 54, and does not protrude from the inner end surface 54. Furthermore, the first protrusion (abutting portion) 80c is provided on a surface of the closing member main body 80a facing the reinforcing member 38.

On the other hand, as illustrated in FIGS. 6 and 9, a pair of left and right second protrusions (restricting portions) 38a and 38a is provided to be separated from each other by a predetermined distance on the back surface of the reinforcing member 38, that is, a surface facing the power roller inner ring 50. The second protrusions 38a and 38a are formed in vertically long rectangular parallelepiped shapes, and are provided at the center portion in the vertical direction of the back surface of the reinforcing member 38 symmetrically with respect to the center portion in the width direction of the back surface.

As illustrated in FIG. 6, the second protrusions 38a and 38a enter the recessed portion 54a, and in this state, the first protrusion 80c is located at the center between the second protrusions 38a and 38a. Each of the second protrusions 38a and 38a has a predetermined gap A with respect to the first protrusion 80c with the first protrusion 80c interposed therebetween, and overlaps the first protrusion 80c by a length L in the axial direction of the power roller inner ring 50.

Here, as illustrated in FIG. 6, in a case where the power roller 40 is at a predetermined neutral position, the predetermined gap A between the first protrusion 80c and a second protrusion 38a is set to be smaller than a minimum distance B between the traction surface 51 of the power roller inner ring 50 and a lubricating oil injection pipe 37 (see FIG. 7). That is, the setting is A<B.

Therefore, when the power roller 40 moves from the neutral position to the left and right by the gap A, and the first protrusion 80c of the power roller 40 abuts on the second protrusions 38a and 38a of the reinforcing member 38, further movement of the power roller 40 is restricted. As described above, since the setting is A<B, even if the power roller 40 moves from the neutral position to the left and right by the amount of the gap A, the traction surface 51 of the power roller inner ring 50 does not collide with the lubricating oil injection pipes 37.

According to such a configuration, during assembly of the toroidal continuously variable transmission or operation of the toroidal continuously variable transmission, in a case where the power roller 40 moves by a predetermined distance (moves by the gap A) in the direction orthogonal to the rotation axis, the first protrusion 80c as an abutting portion located on the inner end surface of the power roller inner ring 50 abuts on a second protrusion 38a as a restricting portion, and further (predetermined distance or more) movement of the power roller 40 is restricted, and thus the power roller 40 can be prevented from interfering with other components including a lubricating oil injection pipe 37 due to the further movement.

Furthermore, although the power roller 40 includes the first protrusion 80c, there is no issue because the first protrusion 80c is provided on the inner end surface of the power roller 40 that is not a high-stress portion. Furthermore, since the first protrusion 80c is very small with respect to the entire power roller 40, the influence of weight increase of the power roller 40 caused by the first protrusion 80c is small.

With such effect of the first protrusion (abutting portion) 80c, a power roller 40 can move from the neutral position to the left and right by the gap A by a first protrusion (abutting portion) 90d, 92d, 95d, or 96d in the first to fourth modifications to be described below or first protrusion (abutting portion) 100c or 101c in the second and third embodiments to be described below, and the first protrusion 90d, 92d, 95d, 96d, 100c, or 101c of the power roller 40 can abut on the second protrusions 38a and 38a of the reinforcing member 38, and thus movement of the power roller 40 can be similarly restricted.

In the present embodiment, although the abutting portion is formed by the first protrusion 80c of the closing member 80 that closes the end surface hole 58 of the power roller inner ring 50, and the restricting portion is formed by a pair of the second protrusions 38a and 38a that is provided in the reinforcing member 38, has the predetermined gap with respect to the first protrusion 80c with the first protrusion 80c interposed therebetween, and overlaps the first protrusion 80c in the axial direction of the power roller inner ring 50, alternatively, the restricting portion may be formed by a protrusion provided in the reinforcing member 38, and the abutting portion may be formed by a hole that is provided in the closing member 80 and into which the protrusion is inserted with a predetermined gap.

FIG. 10 illustrates a first modification of the closing member, and is a cross-sectional view of a main part of the power roller 40 including the closing member.

A closing member 90 of the first modification is integrally formed from metal such as brass or aluminum, and includes a cylindrical body portion 90a, a disk-shaped flange portion 90b formed on one end surface side of the body portion 90a, a caulking portion 90c formed on the other end surface side of the body portion 90a, and a cylindrical first protrusion (abutting portion) 90d protruding from the center portion of the flange portion 90b.

The diameter of the body portion 90a is set to be substantially equal to or slightly smaller than the diameter of the end surface hole 58, and the body portion 90a is in close contact with the inner peripheral surface of the end surface hole 58. The diameter of the flange portion 90b is set to be larger than the diameter of the end surface hole 58, and the flange portion 90b is in close contact with the bottom surface of the recessed portion 54a at one opening peripheral portion of the end surface hole 58.

The caulking portion 90c has a distal end surface (left end surface in FIG. 10) formed in an arcuate cross section, and the outer peripheral portion is a locking portion 90e protruding radially outward from the body portion 90a. The locking portion 90e is formed along the circumferential direction of the body portion 90a, and is locked to the back surface of the wall portion 55 at the other opening peripheral portion of the end surface hole 58.

The locking portion 90e is not formed before such a closing member 90 is attached to (inserted into) the end surface hole 58, and the body portion 90a protrudes from the other opening of the end surface hole 58 in a state of being inserted into the end surface hole 58.

In a state where the body portion 90a is inserted into the end surface hole 58 from the recessed portion 54a and the flange portion 90b abuts on the bottom surface of the recessed portion 54a at the one opening peripheral portion of the end surface hole 58, the distal end portion of the body portion 90a protrudes from the other opening of the end surface hole 58, and thus, by the protruding portion being caulked so as to be crushed using a caulking jig (not illustrated), the caulking portion 90c and the locking portion 90e are formed at the distal end portion of the body portion 90a, and the locking portion 90e is locked to the back surface of the wall portion 55 at the other opening peripheral portion of the end surface hole 58. As a result, the closing member 90 closes the end surface hole 58 and is prevented from coming out of the end surface hole 58.

Since the closing member 90 of the first modification is formed from metal such as brass or aluminum, deterioration due to lubricating oil supplied into the power roller 40 or heat generated in the power roller 40 is reduced as compared with the closing member 80 formed from resin. Furthermore, since the closing member 90 is fixed to the end surface hole 58 by caulking, the closing member 90 can be firmly fixed to the end surface hole 58 as compared with the closing member 80.

Furthermore, since the locking portion 90e is locked to the back surface of the wall portion 55 at the other opening peripheral portion of the end surface hole 58, sealability of the end surface hole 58 is improved, and oil leakage can be prevented.

FIG. 11 illustrates a second modification of the closing member, and is a cross-sectional view of a main part of the power roller 40 including the closing member.

A closing member 92 of the second modification is integrally formed from rubber (hard rubber used for oil seal or the like), and includes a cylindrical body portion 92a, a disk-shaped flange portion 92b formed on one end surface side of the body portion 92a, a disk-shaped flange portion 92c formed on the other end surface side of the body portion 92a, and a cylindrical first protrusion (abutting portion) 92d protruding from the center portion of the flange portion 92b.

The diameter of the body portion 92a is set to be substantially equal to or slightly smaller than the diameter of the end surface hole 58, and the body portion 92a is in close contact with the inner peripheral surface of the end surface hole 58. The diameter of the flange portion 92b is set to be larger than the diameter of the end surface hole 58, and the flange portion 92b is in close contact with the bottom surface of the recessed portion 54a at one opening peripheral portion of the end surface hole 58.

The diameter of the flange portion 92c is set to be larger than the diameter of the end surface hole 58, and the flange portion 92c is in close contact with the back surface of the wall portion 55 at the other opening peripheral portion of the end surface hole 58. Furthermore, the flange portion 92c is formed to have a larger diameter and a larger wall thickness than the flange portion 92b.

Such a closing member 92 pushes the flange portion 90b from the inner ring hole 52 of the power roller inner ring 50 into the end surface hole 58 by the diameter of the flange portion 90b being elastically reduced in the radial direction, and inserts the body portion 92a. Then, when the flange portion 92b passes through the end surface hole 58, the diameter is expanded by an elastic return force, and the flange portion 92b comes into close contact with the bottom surface of the recessed portion 54a at the one opening peripheral portion of the end surface hole 58. At the same time, the body portion 92a is in close contact with the inner peripheral surface of the end surface hole 58, and the flange portion 92c is in close contact with the back surface of the wall portion 55 at the other opening peripheral portion of the end surface hole 58. In this manner, the closing member 92 closes the end surface hole 58 and is prevented from coming out of the end surface hole 58.

Furthermore, since the flange portion 92c is in close contact with the back surface of the wall portion 55 at the other opening peripheral portion of the end surface hole 58, sealability of the end surface hole 58 is improved, and oil leakage can be prevented.

Since the closing member 92 of the second modification is formed from hard rubber used for oil sealing or the like, the sealing performance is higher as compared with closing members 80 and 90, and the weight is lighter as compared with the closing member 80.

FIG. 12 illustrates a third modification of the closing member, and is a cross-sectional view of a main part of the power roller 40 including the closing member.

A closing member 93 of the third modification includes a closing member main body 94 formed from rubber (hard rubber used for oil seal or the like), and a reinforcing portion 95 provided inside the closing member main body 94 and formed from metal such as steel for reinforcing the closing member main body 94 from the inside.

The closing member main body 94 includes a cylindrical body portion 94a, a disk-shaped flange portion 94b formed on one end surface side of the body portion 94a, and a disk-shaped flange portion 94c formed on the other end surface side of the body portion 94a.

The diameter of the body portion 94a is set to be substantially equal to or slightly smaller than the diameter of the end surface hole 58, and the body portion 94a is in close contact with the inner peripheral surface of the end surface hole 58. The diameter of the flange portion 94b is set to be larger than the diameter of the end surface hole 58, and the flange portion 94b is in close contact with the bottom surface of the recessed portion 54a at one opening peripheral portion of the end surface hole 58. The diameter of the flange portion 94c is set to be larger than the diameter of the end surface hole 58, and the flange portion 94c is in close contact with the back surface of the wall portion 55 at the other opening peripheral portion of the end surface hole 58. Furthermore, the flange portion 94c is formed to have a larger diameter and a larger wall thickness than the flange portion 94b.

The reinforcing portion 95 includes a cylindrical body portion 95a and a disk-shaped flange portion 95c formed on the other end surface side of the body portion 95a. The body portion 95a has a smaller diameter and a longer length in the axial direction than the body portion 94a of the closing member main body 94, and is provided to be embedded in the center portion of the body portion 94a except for the distal end portion, and the distal end portion of the body portion 95a protrudes from the distal end surface of the body portion 94a. The protruding portion is a columnar first protrusion (abutting portion) 95d. The flange portion 95c has a smaller diameter and a thinner wall thickness than the flange portion 94c of the closing member main body 94, and is embedded inside the flange portion 94c.

Such a closing member 93 pushes the flange portion 94b from the inner ring hole 52 of the power roller inner ring 50 into the end surface hole 58 by the diameter of the flange portion 94b being elastically reduced in the radial direction, and inserts the body portion 94a. Then, when the flange portion 94b passes through the end surface hole 58, the diameter is expanded by an elastic return force, and the flange portion 94b comes into close contact with the bottom surface of the recessed portion 54a at the one opening peripheral portion of the end surface hole 58. At the same time, the body portion 94a is in close contact with the end surface hole 58, and the flange portion 94c is in close contact with the back surface of the wall portion 55 at the other opening peripheral portion of the end surface hole 58. In this manner, the closing member 93 closes the end surface hole 58 and is prevented from coming out of the end surface hole 58.

Furthermore, since the flange portion 94c is in close contact with the back surface of the wall portion 55 at the other opening peripheral portion of the end surface hole 58, sealability of the end surface hole 58 is improved, and oil leakage can be prevented.

Since the closing member main body 94 of the closing member 93 of the third modification is formed from hard rubber used for oil sealing or the like, the sealing performance is higher as compared with the closing members 80 and 90, and the weight is lighter as compared with the closing member 90. Furthermore, since the closing member main body 94 is reinforced from the inside by the reinforcing portion 95, the mechanical strength is higher as compared with the closing member 92, and the wear resistance is improved since the first protrusion (abutting portion) 95d is also formed from metal such as steel.

FIG. 13 illustrates a fourth modification of the closing member, and is a cross-sectional view of a main part of the power roller 40 including the closing member.

A closing member 96 of the fourth modification is integrally formed from metal or resin, and includes a male screw portion 96a, a disk-shaped flange portion 96b provided on one end portion of the male screw portion 96a, and a cylindrical first protrusion (abutting portion) 96d protruding from the center portion of the flange portion 96b.

The length in the axial direction of the male screw portion 96a is set to be longer than the length in the axial direction of the end surface hole 58 of the power roller inner ring 50. Furthermore, a female screw portion 58a is formed in the end surface hole 58 of the power roller inner ring 50, and the male screw portion 96a is screwed into the female screw portion 58a.

The diameter of the flange portion 96b is set to be larger than the diameter of the end surface hole 58, and the flange portion 96b is in close contact with the bottom surface of the recessed portion 54a at one opening peripheral portion of the end surface hole 58.

The male screw portion 96a is screwed into the female screw portion 58a of the end surface hole 58 from the recessed portion 54a of the power roller inner ring 50, and the flange portion 96b is brought into close contact with the bottom surface of the recessed portion 54a at the one opening peripheral portion of the end surface hole 58, thereby such a closing member 96 closes the end surface hole 58 and is prevented from coming out of the end surface hole 58.

Furthermore, since the male screw portion 96a and the female screw portion 58a are screwed together, sealability of the end surface hole 58 is improved, and oil leakage can be prevented.

Since the closing member 96 of the fourth modification is fixed to the end surface hole 58 by the male screw portion 96a being screwed into the female screw portion 58a of the end surface hole 58, the closing member 96 can be firmly fixed to the end surface hole 58 as compared with closing members 80, 92, and 93, and can be easily fixed to the end surface hole 58 as compared with the closing member 90.

Second Embodiment

FIG. 14 is a cross-sectional view illustrating a power roller 40 of a double cavity toroidal continuously variable transmission according to a second embodiment, and FIG. 15 is a cross-sectional view of the main part.

The second embodiment is different from the first embodiment in that a closing member is fixed to a power roller outer ring 60, and thus this point will be described below, and the same components as those of the first embodiment are denoted by the same reference signs, and description thereof may be omitted or simplified.

In the second embodiment, similarly to the first embodiment, the power roller outer ring 60 includes a disk-shaped outer ring main body 61 and support shafts 62 and 63 provided integrally with the outer ring main body 61. A support shaft (outer ring shaft) 62 is erected coaxially with an inner ring hole 52 on the inner end surface of the outer ring main body 61 facing a power roller inner ring 50.

Furthermore, the support shaft 62 includes an oil hole 62a that is extending in the axial direction and opens to the distal end surface of the support shaft 62 at the center portion. The oil hole 62a includes an oil hole 62e provided in the base end portion of the support shaft 62, and an oil hole 62f provided continuously with the oil hole 62e at the distal end portion of the support shaft 62 and having a larger diameter than the oil hole 62e. The oil hole 62f is provided coaxially with the oil hole 62e, and has a shorter length in the axial direction than the oil hole 62e. Since the oil hole 62e has a smaller diameter than the oil hole 62f, a step surface 62g is provided at the bottom portion of the oil hole 62f.

Furthermore, an introduction hole 66 for introducing lubricating oil into the oil hole 62a is provided in the bottom portion of the oil hole 62a, that is, the bottom portion of the oil hole 62e so as to penetrate the outer ring main body 61 in the thickness direction. Furthermore, a plurality of discharge holes 62b is provided at predetermined intervals in the circumferential direction in the outer peripheral surface of the bottom portion of the oil hole 62a, and the discharge holes 62b radially discharge the lubricating oil supplied to the oil hole 62a outward from the support shaft 62.

The lubricating oil discharged from the discharge holes 62b is supplied to a thrust rolling bearing 71 arranged outside the discharge holes, and flows outside the support shaft 62 from the thrust rolling bearing 71 in the axial direction to be supplied to a radial needle bearing 70.

Furthermore, an end surface hole 58 provided through a wall portion 55 at the center portion of the bottom surface of a recessed portion 54a of the power roller inner ring 50 is closed by a closing member 100 separate from the power roller inner ring 50 and the power roller outer ring 60.

The closing member 100 is formed from metal or resin, and includes a cylindrical body portion 100a, a cylindrical fixing portion 100b provided coaxially and integrally with the body portion 100a at the base end portion of the body portion 100a, and a first protrusion (abutting portion) 100c provided coaxially and integrally with the body portion 100a at the distal end portion of the body portion 100a.

The body portion 100a is arranged coaxially with the end surface hole 58 provided in the power roller inner ring 50, and the diameter of the body portion 100a is smaller than the diameter of the end surface hole 58. Therefore, a predetermined gap S is provided between the outer peripheral surface of the body portion 100a and the inner peripheral surface of the end surface hole 58.

The leakage amount of lubricating oil from the gap S is small, and the dimension of the gap S is set such that the leakage amount of the lubricating oil from the gap S is, for example, 0.1 liters or less per minute. Furthermore, a seal member (not illustrated) may be provided in the gap S to reduce oil leakage from the gap S.

Furthermore, the distal end portion of the body portion 100a penetrates the end surface hole 58, and the distal end surface slightly protrudes from the bottom surface of the recessed portion 54a.

The fixing portion 100b is formed to have substantially the same diameter as or a slightly smaller diameter than the oil hole 62f, and the bottom surface of the fixing portion 100b abuts on the step surface 62g. Furthermore, the outer peripheral surface of the fixing portion 100b is in close contact with the inner peripheral surface of the oil hole 62f. The fixing portion 100b is fixed to the oil hole 62f. In a case where the closing member 100 is formed from metal, the fixing may be performed by interference fitting, press fitting, welding, or the like. In a case where the closing member 100 is formed from resin, the fixing may be performed by an adhesive. By the bottom surface of the fixing portion 100b being caused to abut on the step surface 62g, positioning of the closing member 100 in the axial direction can be performed.

Furthermore, since the bottom surface of the fixing portion 100b is abutted on by the step surface 62g and the outer peripheral surface of the fixing portion 100b is in close contact with the inner peripheral surface of the oil hole 62f, sealability of the end surface hole 58 is improved, and oil leakage can be prevented.

Furthermore, the gap S between the inner peripheral surface of the end surface hole 58 of the power roller inner ring 50 and the outer peripheral surface of the closing member 100 is larger than a bearing effective gap in the radial direction of the radial needle bearing 70 provided between the inner peripheral surface of the inner ring hole 52 and the outer peripheral surface of the support shaft (outer ring shaft) 62.

As described above, since the closing member 100 is fixed to the support shaft (outer ring shaft) 62 of the power roller outer ring 60, even if the power roller inner ring 50 moves in the radial direction in the bearing effective gap of the radial needle bearing 70 with the rotation, the closing member 100 fixed to the power roller outer ring 60 does not hit the inner peripheral surface of the end surface hole 58 of the rotating power roller inner ring 50, that is, the closing member 100 and the end surface hole 58 do not interfere with each other. Therefore, wear of the closing member 100 and the end surface hole 58 can be prevented.

Furthermore, since the closing member 100 does not rotate with rotation of the power roller inner ring 50, as described above, in a case where the reinforcing member 38 that reinforces the trunnion 35 includes the restricting portions 38a and 38a that is abutted on by the first protrusion (abutting portion) 100c to restrict further movement of the power roller 40 when the power roller 40 moves by a predetermined distance in the direction orthogonal to the rotation axis, the first protrusion (abutting portion) 100c only abuts on the restricting portions 38a and 38a without rotating, and thus wear of the first protrusion (abutting portion) 100c and the restricting portions 38a and 38a can be reduced.

Note that, in the present embodiment, effect similar to that of the first embodiment can be obtained, that is, the effect can be obtained in which processability and conveyability of the power roller inner ring 50 can be ensured while oil leakage from the inner end surface 54 of the power roller inner ring 50 and a decrease in rigidity of the power roller inner ring 50 are reduced.

Third Embodiment

FIG. 16 is a cross-sectional view illustrating a power roller 40 of a double cavity toroidal continuously variable transmission according to a third embodiment, and FIG. 17 is a cross-sectional view of the main part.

The third embodiment is different from the first and second embodiments in that the distal end portion of an outer ring shaft (support shaft) 62 that rotatably supports a power roller inner ring 50 is a closing member that closes an end surface hole 58b of the power roller inner ring 50, and thus this point will be described below, and the same components as those of the first and second embodiments are denoted by the same reference signs, and description thereof may be omitted or simplified.

In the third embodiment, similarly to the first and second embodiments, a power roller outer ring 60 includes a disk-shaped outer ring main body 61 and support shafts 62 and 63 provided integrally with the outer ring main body 61. A support shaft (outer ring shaft) 62 is erected coaxially with an inner ring hole 52 on the inner end surface of the outer ring main body 61 facing a power roller inner ring 50.

Furthermore, the support shaft 62 includes an oil hole 65 extending in the axial direction at a position eccentric from the center portion so as to extend in the axial direction, and the distal end portion of the oil hole 65 does not reach the distal end surface of the support shaft 62 and is closed. Furthermore, the base end portion of the oil hole 65 penetrates the outer ring main body 61 and opens to the outer end surface, and lubricating oil is supplied to the oil hole 65 from the opening. Furthermore, a plurality of discharge holes 65b is provided at predetermined intervals in the circumferential direction in the middle of the oil hole 65, and the oil hole 65b radially discharges the lubricating oil supplied to the oil hole 65 outward from the support shaft 62.

The lubricating oil discharged from the discharge holes 65b is supplied to a thrust rolling bearing 71 arranged outside the discharge holes, and flows outside the support shaft 62 from the thrust rolling bearing 71 in the axial direction to be supplied to a radial needle bearing 70.

Furthermore, the outer ring shaft (support shaft) 62 has a cylindrical protrusion portion 101 at the distal end portion, and the protrusion portion 101 is a closing member 101. The closing member 101 is formed integrally with the outer ring shaft (support shaft) 62 and has a smaller diameter than the end surface hole 58b of the power roller inner ring 50.

Furthermore, the end surface hole 58b of the power roller inner ring 50 is formed to have a smaller diameter as compared with end surface holes 58 in the first and second embodiments, and the closing member 101 is inserted into the end surface hole 58b from the inner ring hole 52. The distal end portion of the closing member 101 inserted in this manner protrudes from the end surface hole 58b and also protrudes from a recessed portion 54a of the power roller inner ring 50. The protruding portion is a first protrusion (abutting portion) 101c that abuts on the above-described restricting portions 38a and 38a (see FIGS. 6 and 9).

Furthermore, a recessed groove 101d is provided along the circumferential direction in the base end portion of the first protrusion (abutting portion) 101c. One inner wall surface of the recessed groove 101d is substantially flush with the bottom surface of the recessed portion 54a of the power roller inner ring 50, and a ring member 102 is fitted into the recessed groove 101d. The outer diameter of the ring member 102 is larger than the outer diameter of the end surface hole 58b, and thus oil leakage from a gap S between the inner peripheral surface of the end surface hole 58b and the outer peripheral surface of the closing member 101 can be prevented.

Furthermore, the gap S between the inner peripheral surface of the end surface hole 58b and the outer peripheral surface of the closing member 101 is larger than a bearing effective gap in the radial direction of the radial needle bearing 70 provided between the inner peripheral surface of the inner ring hole 52 and the outer peripheral surface of the support shaft (outer ring shaft) 62.

As described above, since the closing member 101 is fixed to the support shaft (outer ring shaft) 62 of the power roller outer ring 60, that is, the closing member 101 is integrally formed with the support shaft (outer ring shaft) 62, even if the power roller inner ring 50 moves in the radial direction in the bearing effective gap of the radial needle bearing 70 with the rotation, the closing member 101 fixed to the power roller outer ring 60 does not hit the inner peripheral surface of the end surface hole 58b of the rotating power roller inner ring 50. Therefore, wear of the closing member 101 and the end surface hole 58b can be prevented.

Furthermore, since the closing member 101 does not rotate with rotation of the power roller inner ring 50, as described above, in a case where the reinforcing member 38 that reinforces the trunnion 35 includes the restricting portions 38a and 38a that are abutted on by the first protrusion (abutting portion) 101c to restrict further movement of the power roller 40 when the power roller 40 moves by a predetermined distance in the direction orthogonal to the rotation axis, the first protrusion (abutting portion) 101c only abuts on the restricting portions 38a and 38a without rotating, and thus wear of the first protrusion (abutting portion) 101c and the restricting portions 38a and 38a can be reduced.

Furthermore, since the distal end portion of the support shaft (outer ring shaft) 62 is the closing member 101, the end surface hole 58b of the power roller inner ring 50 can be closed, by the power roller inner ring 50 being assembled to the power roller outer ring 60, without a closing member being separately prepared.

Note that, in the present embodiment, effect similar to those of the first and second embodiments can be obtained, that is, the effect can be obtained in which processability and conveyability of the power roller inner ring 50 can be ensured while oil leakage from the inner end surface 54 of the power roller inner ring 50 and a decrease in rigidity of the power roller inner ring 50 are reduced.

Note that, in the first to third embodiments, a case where the power roller outer ring 60 includes the eccentric support shafts 62 and 63 has been described as an example, but the present invention can also be applied to a case where a support shaft that rotatably supports the power roller inner ring 50 is provided coaxially with the power roller outer ring 60 at the center portion of the power roller outer ring 60.

Furthermore, the present invention can also be applied to a single cavity half-toroidal continuously variable transmission.

REFERENCE SIGNS LIST

2 Input side disk
3 Output side disk
14 Pivot shaft
35 Trunnion
38 Reinforcing member
80c, 90d, 92d, 95d, 96d, 100c, 101c First protrusion (abutting portion)
38a Second protrusion (restricting portion)
40 Power roller
50 Power roller inner ring
58, 58b End surface hole
60 Power roller outer ring
62 Support shaft (outer ring shaft)
70 Radial needle bearing (bearing)
80, 90, 92, 93, 96, 100, 101 Closing member

The invention claimed is:

1. A toroidal continuously variable transmission comprising:
   an input side disk and an output side disk that are concentrically and rotatably provided with inner surfaces facing each other;
   a power roller sandwiched between both disks; and
   a trunnion that rotatably supports the power roller and is tilted about pivot shafts that are at twisted positions with respect to central axes of the input side disk and the output side disk,
   wherein the power roller includes a power roller inner ring sandwiched between the both disks, a power roller outer ring that is provided in the trunnion and rotatably supports the power roller inner ring, and an inner ring hole provided in the power roller inner ring so as to extend in an axial direction of the power roller inner ring,
   wherein an end surface hole communicating with the inner ring hole is provided in an inner end surface of the power roller inner ring, and the end surface hole is closed by a closing member separate from the power roller inner ring, attached from a side of the inner end surface of the power roller inner ring, and
   wherein the closing member is formed with a plurality of claws that extend in the axial direction from the closing member and are inserted into the end surface hole.

2. The toroidal continuously variable transmission according to claim 1,
   wherein the closing member is fixed to the power roller inner ring.

3. The toroidal continuously variable transmission according to claim 1,
   wherein the closing member is fixed to the power roller outer ring.

4. The toroidal continuously variable transmission according to claim 3,
   wherein the power roller outer ring includes an outer ring shaft that is inserted into the inner ring hole and rotatably supports the power roller inner ring, and
   a gap between an inner peripheral surface of the end surface hole and an outer peripheral surface of the closing member is larger than a bearing effective gap in a radial direction of a bearing provided between an inner peripheral surface of the inner ring hole and an outer peripheral surface of the outer ring shaft.

5. The toroidal continuously variable transmission according to claim 1 further comprising a reinforcing member that is arranged on an inner end surface side of the power roller inner ring and reinforces the trunnion by both end portions being fixed to the trunnion, wherein the closing member includes a closing member main body that closes the end surface hole and an abutting portion provided on a surface of the closing member main body facing the reinforcing member, and the reinforcing member includes a restricting portion that is abutted on by the abutting portion to restrict further movement of the power roller in a case where the power roller moves by a predetermined distance in a direction orthogonal to a rotation axis of the power roller.

6. The toroidal continuously variable transmission according to claim 1, wherein an inner diameter of the end surface hole is smaller than an inner diameter of the inner ring hole.

7. The toroidal continuously variable transmission according to claim 1, wherein the power roller outer ring includes an outer ring shaft that is inserted into the inner ring hole and rotatably supports the power roller inner ring, and a gap between an inner peripheral surface of the end surface hole and an outer peripheral surface of the closing member is larger than a bearing effective gap in a radial direction of a bearing provided between an inner peripheral surface of the inner ring hole and an outer peripheral surface of the outer ring shaft.

8. The toroidal continuously variable transmission according to claim 1, wherein the closing member does not protrude from a recessed portion provided in the inner end surface of the power roller inner ring.

9. The toroidal continuously variable transmission according to claim 1, wherein the closing member is formed to have a larger diameter than the end surface hole.

* * * * *